United States Patent [19]
George

[11] Patent Number: 5,497,508
[45] Date of Patent: Mar. 5, 1996

[54] METHOD AND APPARATUS FOR EFFICIENTLY MONITORING A PLURALITY OF RADIO CHANNELS TO DETECT MESSAGE SIGNALS

[75] Inventor: David L. George, Colleyville, Tex.

[73] Assignee: Uniden America Corporation, Forth Worth, Tex.

[21] Appl. No.: 954,314

[22] Filed: Sep. 30, 1992

[51] Int. Cl.$^6$ .................................................. H04B 1/16
[52] U.S. Cl. ..................... 455/161.2; 455/32.1; 455/67.1; 455/166.1; 455/186.1
[58] Field of Search .................. 455/32.1, 33.1, 455/33.4, 54.1, 56.1, 67.1, 161.2, 166.1, 166.2, 161.1, 168.1, 185.1, 186.1, 33.4, 34.1, 34.2

[56] References Cited

U.S. PATENT DOCUMENTS

| | | | |
|---|---|---|---|
| 4,903,320 | 2/1990 | Hanawa | 455/34.2 |
| 5,093,926 | 3/1992 | Sasuta | 455/56.1 X |
| 5,189,413 | 2/1993 | Gaskill et al. | 455/161.1 X |

Primary Examiner—Chi H. Pham
Attorney, Agent, or Firm—Richards, Medlock & Andrews

[57] ABSTRACT

A method and apparatus for efficiently monitoring a plurality of radio channels in a data communication system in which mobile message receiving devices are programmed to receive messages on a plurality of channels by selecting a group of channels for scanning, based upon detection of signal activity in the radio channels.

12 Claims, 2 Drawing Sheets

METHOD AND APPARATUS FOR EFFICIENTLY MONITORING A PLURALITY OF RADIO CHANNELS TO DETECT MESSAGE SIGNALS

TECHNICAL FIELD OF THE INVENTION

The present invention pertains in general to monitoring of radio channels to detect message signals and in particular to radio communications in mobile telephone devices programmed to receive message signals on a plurality of radio channels.

BACKGROUND OF THE INVENTION

In two-way radio systems in which a plurality of radio channels can be used to communicate between transmitter stations and mobile transmitter/receivers, it is common for the geographic areas covered by some of the channels to overlap to some extent. Thus, it frequently occurs that these overlapping channels can be separated from the remainder of the radio channels into groups or blocks of geographically common coverage. Furthermore, it is often the case that the geographic area covered by one group of channels may be located so that there is no overlap with the geographic coverage of another group of channels.

Mobile transmitter/receiver devices, such as vehicular mounted units (mobile units) or handheld units (portable units), that can move freely throughout wide-ranging areas must be able to detect messages on all radio channels used in the areas in which it moves. In prior art mobile radio devices, all of the channels that the device might potentially use in any of its operational area were scanned in order to be certain that all messages directed to the unit had been received. A problem with these prior art radio devices is that a significant amount of time is required to scan and monitor each of the channels that the device would be programmed to receive. The time required for scanning every channel created the risk that some messages sent to the radio device on a particular channel might not be detected because the device was busy scanning other channels for messages at the time of reception. This problem is exacerbated with radio systems consisting of a large number of channels. For example, trunking systems are radio systems containing multiple radio channels that are automatically shared by all of the mobile or portable radio assigned to the system. The greater the number of channels required to be monitored by a particular receiving device, the greater likelihood that a message signal directed to the receiving device would not be detected.

In view of this problem, there exists a need for a method and apparatus for efficiently monitoring a plurality of radio channels for message signals to reduce the amount of time spent scanning radio channels, thereby increasing the likelihood of receiving a message directed to the receiving device.

SUMMARY OF THE INVENTION

A selected embodiment of the present invention is a message communication system for efficient transmission and detection of message signals on a plurality of radio channels. In this system, the radio channels are divided into groups of channels, and message transmitters are used to transmit various message signals on the plurality of radio channels. Mobile message receiving devices capable of detecting messages on each of the plurality of channels move throughout an area including the transmission areas for the various message transmitters. These mobile message receiving devices scan for message signals within a first group of channels by monitoring each channel in the group one time, and if no messages are detected, the device switches to a second group of channels to check each channel once for messages. This process of scanning through a group of channels one time is referred to as "sampling" of the group. Sampling group by group continues until a message is detected, at which time the mobile message receiving device switches to scan only the group of channels containing the channel on which the message was detected. This group of channels is scanned for an extended time, or until a predetermined time period has expired, at which time the mobile message receiving device reverts to its group sampling mode. To improve the operation of the system and to prevent in advertent switching into group by group sampling mode, a further embodiment of the message communication system provides that at least one of the message transmitters periodically transmits bursts of data on at least one of the radio channels, thereby assuring continued monitoring of a selected group of channels, even if no message signals are transmitted in that group.

Another embodiment of the present invention is a method for efficiently monitoring a plurality of radio channels to detect message signals where the plurality of channels is divided into at least two groups of channels. According to this method, the plurality of radio channels are scanned for message signals until a message is detected on a particular channel. Upon detection, the scanning activity is confined to a selected group of channels which includes the channel on which the message was detected. This group of channels is scanned for message signals until it is determined that no message signal has been detected in any of the channels of the group for at least a predetermined time period.

According to an alternative embodiment of the present invention, a message receiving device monitors only a first group of channels by retrieving channel block information from memory which identifies channel groups into which the plurality of radio channels are divided. By comparing the retrieved channel block information with the channel on which the first message was received, the group of channels can be selected which contains the designated channel.

With respect to another embodiment of the invention, the decision to switch from a group scan mode to the mode of scanning the plurality of channels is implemented by activating a clock for a predetermined time period, monitoring whether there is any message signal activity in a particular group of channels and upon determining that there have been no messages detected for the predetermined time period, switching to scan the plurality of radio channels.

According to a still further embodiment of the present invention, a plurality of radio channels divided into channel groups are efficiently monitored to detect message signals by successively monitoring channels within a first channel group, but then switching to sample channels within alternative groups if no message signal activity is detected in the first channel group for at least a first predetermined time period. If, upon sampling channels within a particular channel group, a message signal is detected on a channel, only those channels within that group are successively monitored.

Another selected embodiment of the present invention is a mobile message receiving device which includes a selectively tunable receiver which can be tuned to different radio channels, a memory storage device for storing channel block information, and a controller. The elements are coupled to selectively tune the receiver to scan each channel in a first channel group. The first channel group is identified by the channel block information stored in memory. If no message signal is received in the first channel group for a predetermined time period, the controller is coupled to selectively tune the receiver to scan a second channel group identified by the channel block information stored in memory. In one embodiment of this device, the first channel group includes at least the channel on which a message signal is first detected and the second channel group includes channels not included within the first channel group. In another embodiment of the device, the first channel includes the first channel on which a message is first detected and the second channel group includes all radio channels which the receiving device can receive messages on.

Another embodiment of the present invention includes a two-way radio for monitoring radio channels, comprising a receiver, a zone register, a memory for storing zone information defining groups of radio channels and for storing channel information identifying a plurality of radio channels, and a controller. The zone register can be physically separate from the memory, or could alternatively be located within the controller or could be included as a special area within the memory. According to this embodiment, the controller is coupled to the memory, zone register and receiver to successively monitor the plurality of channels identified by the channel identification information in memory. All of the channels are successively monitored until a message signal is detected on a first channel, at which time the controller loads zone information into the zone register. This zone information identifies a group of channels containing the first channel on which a message signal is detected. With the zone information loaded into the zone register, the radio then scans for message signals only in the group of channels identified with the zone information.

In a still further aspect of the present invention, a mobile receiving device is disclosed which successively monitors each of a plurality of radio channels as identified by channel identification information stored in memory. In particular, channel identification information for one channel is retrieved to monitor that channel for any message activity. If none is detected, the device counter is incremented to retrieve channel identification information for the next channel stored in memory. This successive monitoring continues until a message signal is detected, at which time a group of channels is selected which includes the channel on which the message signal was detected. The device then monitors only the channels within the selected group until such time as no message signal has been detected for at least a given time period. At this time, the device reverts to again successively monitoring each and every channel of the plurality of radio channels stored in memory.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
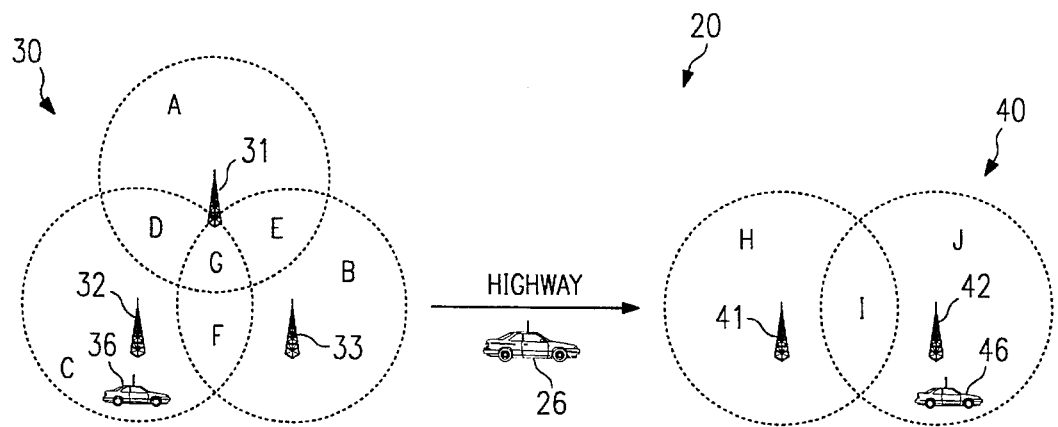
FIG. 1 is a schematic illustration of a broadcast communication system having two, physically separate groups of radio channels, each group having radio channels with overlapping geographic zones.

The present invention relates to a data communications system that communicates message signals from a plurality of transmitter stations by way of a communications medium to at least one remote station, such as a mobile or portable radio. Although the communications medium is described in terms of a plurality of radio frequency (RF) channels, other types of communications medium may also be covered by the present invention where the medium requires separate and distinct monitoring of signal carriers within the medium. Further, both data message signals and analog message signals (such as voice signals) are included within the scope of the present invention. In FIG. 1 there is illustrated a data communication system 20 in which the present invention can be used. The system 20 includes a first group 30 of transmitter stations 31, 32, 33. Each station includes a tower having an antenna operating in conjunction with radio transmitting and receiving equipment. Each station may have one or more channels for communication.

Station 31 provides communications over a geographic area which is designated as zone A. Likewise, station 32 covers zone C and station 33 covers zone B. As shown, the zones of the stations in the first group 30 overlap with one another. Zones A and C overlap in region D, zones A and B overlap in region E, zones B and C overlap in region F, and all of the zones A, B and C overlap in region G.

Also shown in FIG. 1 is a second group 40 of overlapping geographic zones for two transmitter stations 41, 42. Station 41 may have a plurality of radio channels covering geographic zone H and station 42 may have a plurality of radio channels covering geographic zone J where the intersection of zones J and H overlap at region I.

The transmitter stations 31, 32, 33, 41 and 42 may be any suitable commercially available transmitter. The arrangement of the transmitters as shown in FIG. 1 is an example of a commonly occurring transmitter arrangement where one group 30 of transmitters having overlapping regions is physically separate from a second group 40 of transmitters having overlapping coverage areas.

Portable or mobile message receiving devices, such as those included in vehicles 26, 36 or 46, are capable of moving throughout a region including the area covered by the first group of channels 30 and the second group of channels 40. Such mobile message receiving devices must be able to detect and receive messages on each of the radio channels transmitted on each of the transmitter stations in the area in which the mobile receiving device travels. In the example shown in FIG. 1, the vehicle 36 must be able to monitor all of the radio channels transmitted from station 31, station 32 and station 33, and must also be able to monitor each of the channels transmitted on station 41 and on station 42, in order to be sure that any message being transmitted to the user in vehicle 36 is detected and received.

Mobile message receiving units can be programmed with channel identification information that identifies each radio channel which is transmitted in the area in which the vehicle is likely to travel. However, because of the time required to check each and every radio channel transmitted by each transmitter station in the vehicle's travel area, there is a risk that a message transmitted to the vehicle 36 on a particular channel would not be detected because the radio was in the process of monitoring other channels at the time of message transmission. The present invention provides for an efficient, low cost method and apparatus for monitoring only those radio channels on which the mobile message receiving device is likely to receive messages.

In accordance with one embodiment of the present invention, the message receiving device in vehicle 36 is located in the transmission area of the first group of transmitting stations 30. With each transmitter station 31, 32, 33 transmitting on at least one radio channel, the combination of these channels from the first group of transmitters 30 can be referred to as the first group of radio channels. Because of its physical location, the message receiving device in vehicle 36 cannot detect transmissions from stations 41 and 42, and therefore need not monitor the channels corresponding to stations 41 and 42 for messages because none would be detected by the vehicle 36.

As a message receiving device leaves the area covered by the first of group transmitters 30 and travels on a highway, as shown by the vehicle 26 in FIG. 1, the receiving device no longer has a preferred group of radio channels on which to focus its monitoring activities, and can at this point monitors each and every radio channel which it is programmed to receive messages on. Not knowing which channels it is likely to receive messages on, the message receiving device in vehicle 26 steps through every possible channel in an attempt to detect message signal activity, even though the process of checking every channel does require significant amounts of time in radio devices capable of operating on fifty or more radio channels.

As a message receiving unit leaves the highway shown in FIG. 1 and enters into an area covered by a second group of transmitter stations 40, the message receiving device in vehicle 46 switches to monitor only those radio channels being transmitting on radio stations 41 and 42, because those are the channels on which a message signal is most likely to be detected, given the physical location of the vehicle 46.

In accordance with the system described above, the message receiving device of the present invention must decide whether to monitor a group of channels or to monitor all channels for message signals. Although a number of different technologies could be used in executing the decision process (such as the LORAN System, the GPS System which is based on satellite transmissions, or other related positioning technologies), these technologies require special equipment and added expense. The present invention provides an improved, efficient, low-cost method and apparatus for selecting which channels should be monitored and which channels should not be monitored at a given time, thereby reducing the time required to scan for message signals and improving the likelihood that a transmitted message signal will be detected.

Figure 2:
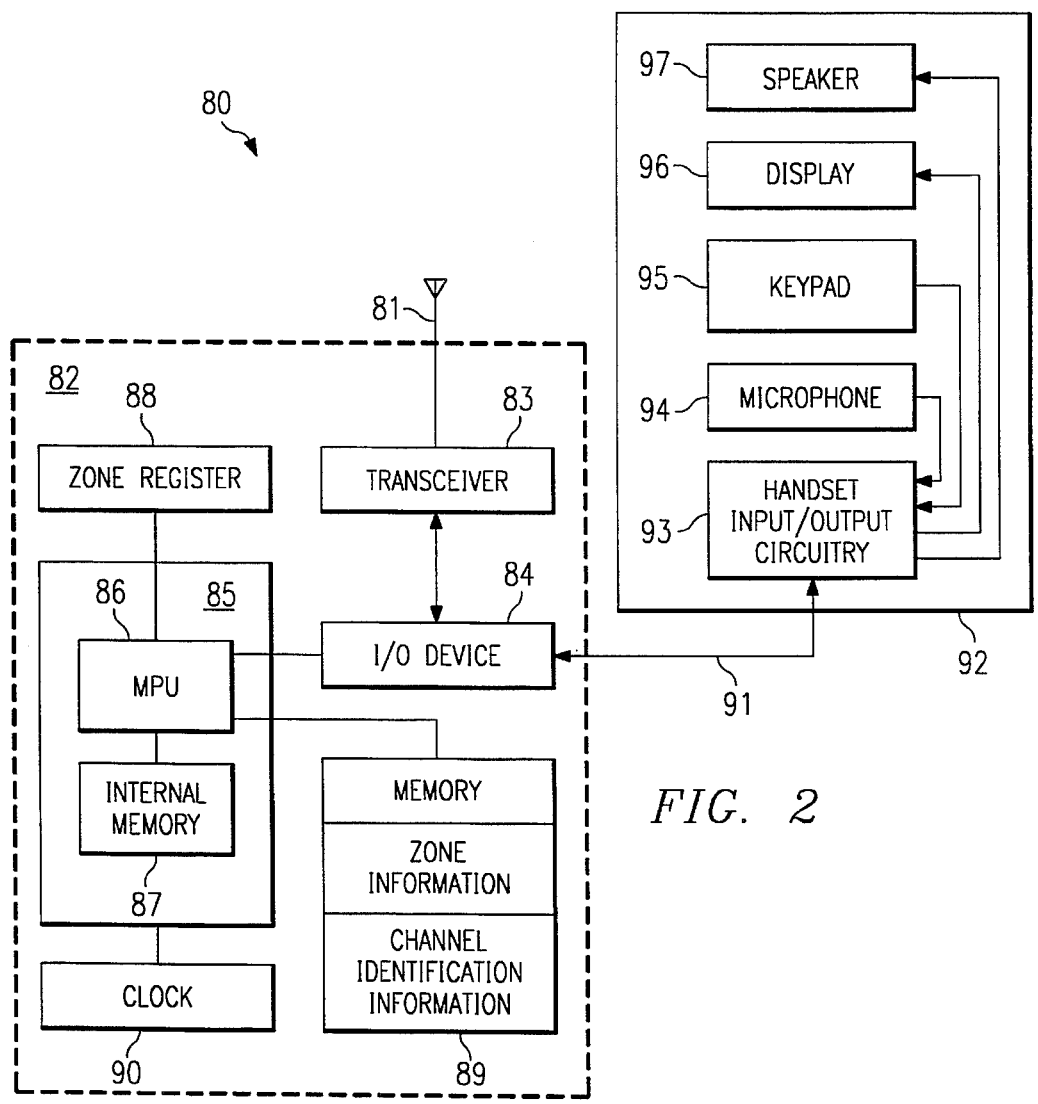
FIG. 2 is a block diagram for a mobile radio receiving device for use in accordance with one embodiment of the present invention.

A mobile message receiving device, such as a mobile radio 80, for use in the present invention is illustrated in FIG. 2. Such mobile telephones may be of the type sold by Uniden America Corporation, such the SMS900TSD, full duplex, 900 MHz mobile telephone. This radio has the capability to scan up to fifty different trunking systems. The mobile radio 80 shown in FIG. 2 includes an antenna 81, a base station 82 and a handset 92. The antenna 81 and base station 82 are connected together in a conventional manner, and the handset 92 is connected to the base station 82 either by way of phone cord 91 or by way of radio frequency communication, which is not shown in FIG. 2 but is well known in the cordless phone art.

The antenna 81 consists of single or multiple antennas which receive message signals transmitted through radio frequency media, and may also transmit messages from the message receiving device to other receivers. The antenna 81 is coupled to a transmitter/receiver unit 83 which functions to tune the antenna 81 to various radio channels and to decode detected message signals received through the antenna 81. The transmitter/receiver (or transceiver) 83 as shown in FIG. 2 is coupled to a master input/output device 84 which functions to switch and connect signals from the transceiver 83 with the remainder of the mobile phone 80.

Within the base station 82, the I/O device 84 is coupled to the microcomputer 85 which includes an MPU 86 as well as associated internal memory 87. The controlling functions of the microcomputer 85 may instead be accomplished with decoder circuitry, as will be appreciated by those skilled in the art. Optionally coupled to the microcomputer 85 is a zone register 88 for storing channel block information as will be described more fully below. A clock 90 may also be coupled to the microcomputer 85.

The base station 82 further comprises a memory storage device 89. The memory storage device 89 may be of any suitable type of data storage mechanism, such as PROM, EEPROM, ROM, RAM, or other suitable storage device. In a preferred embodiment of the invention, the memory storage device 89 is a programmable read only memory which stores channel identification information and zone information. Channel identification information is the data programmed into the memory storage device 89 which identifies each of the radio channels that are monitored by the mobile radio 80. The zone information identifies groups into which the various radio channels are divided. In a preferred embodiment, the zone information would identify, by way of example, one group of radio channels whose transmission areas overlap with one another, and a second group of overlapping channels which do not overlap with any of the radio channels in the first group. Although the channel identification information and zone information is stored in the external memory storage device 89 in the preferred embodiment of the invention, this information may also be stored in the internal memory 87 of the microcomputer 85 or in any other memory area of the mobile radio 80.

As shown in FIG. 2, the I/O device 84 is coupled through phone cord 91 to the handset 92, and in particular is coupled to the handset input/output circuitry 93. The handset I/O circuitry 93 functions to switch and connect the various elements within the handset 92, including the microphone 94, keypad 95, display 96 and speaker 97. Each of these handset elements are connected together and operate in a conventional manner, and are therefore not described in detail.

In the system 20 shown in FIG. 1, each vehicle 36, 26, 46 is equipped with a message receiving device, such as the mobile telephone 80 depicted in FIG. 2. Each device 80 has been programmed with channel identification information identifying the various radio channels which are transmitted from the transmitter stations 31, 32, 33, 41 and 42. Each mobile phone 80 is also programmed with zone information by which the channels are divided into groups, such as a first group and a second group corresponding to the first group of transmitters 30 and the second group of transmitters 40, respectively. In one embodiment of the present invention, the microcomputer 85 retrieves channel identification information from the memory 89 and causes the I/O device 84 and transceiver 83 to selectively tune the antenna 81 so that each of the radio channels identified by the retrieved channel identification information is scanned in succession to detect any message signals. The mobile phone 80 continues to operate in this fashion until a message signal is detected on a first radio channel, at which time the microcomputer 85 executes instructions to determine which of the programmed groups of channels contain the channel on which the message was received. Although the determination of which group contains the channel can be accomplished in a number of ways, one way of determining the proper group is by having the channel identification information and zone information arrayed in the memory 89 so that each channel identification data has appended to it the corresponding group identification data. This is referred to as channel block information. With this arrangement, the channel on which the message is first detected is compared to each of the channels identified in the memory 89, and upon detection of coincidence, the appended group or zone information is retrieved from the memory 89 and the microcomputer 85 then limits its scanning activities to those channels within the identified group. The mobile phone 80 continues to monitor only the identified group of channels until the microcomputer 85, in conjunction with clock 90, determines that no message signal has been received on any of the channels within the group of channels for a predetermined time period, at which time the microcomputer 85 reverts to scanning all of the radio channels identified by the channel identification information stored in the memory 89.

Alternatively, the microcomputer 85 may instead sequentially scan each channel once (or sample) in a first group of channels to detect message signals, and if no message signal is detected in the first group of channels, select a second group of channels wherein each channel is scanned one time for message signals. This procedure, called group sampling, continues until the mobile telephone 80 detects a message signal on a first channel, at which time, zone information corresponding to the selected group is stored in a zone register 88 and the microcomputer 85 begins a period of extended monitoring of the selected group. During this period of selective monitoring, the microcomputer 85 successively scans only those channels within the selected group as identified in the zone register 88, and continues to circulate and scan these channels until the microcomputer 85 in conjunction with the clock 90 determine that no message signal has been detected in the selected group of channels for a minimum time period. Upon so determining, the zone register 88 is cleared and the microcomputer 85 reverts to scanning all of the channels identified by the channel identification information in the memory 89.

Figure 3:
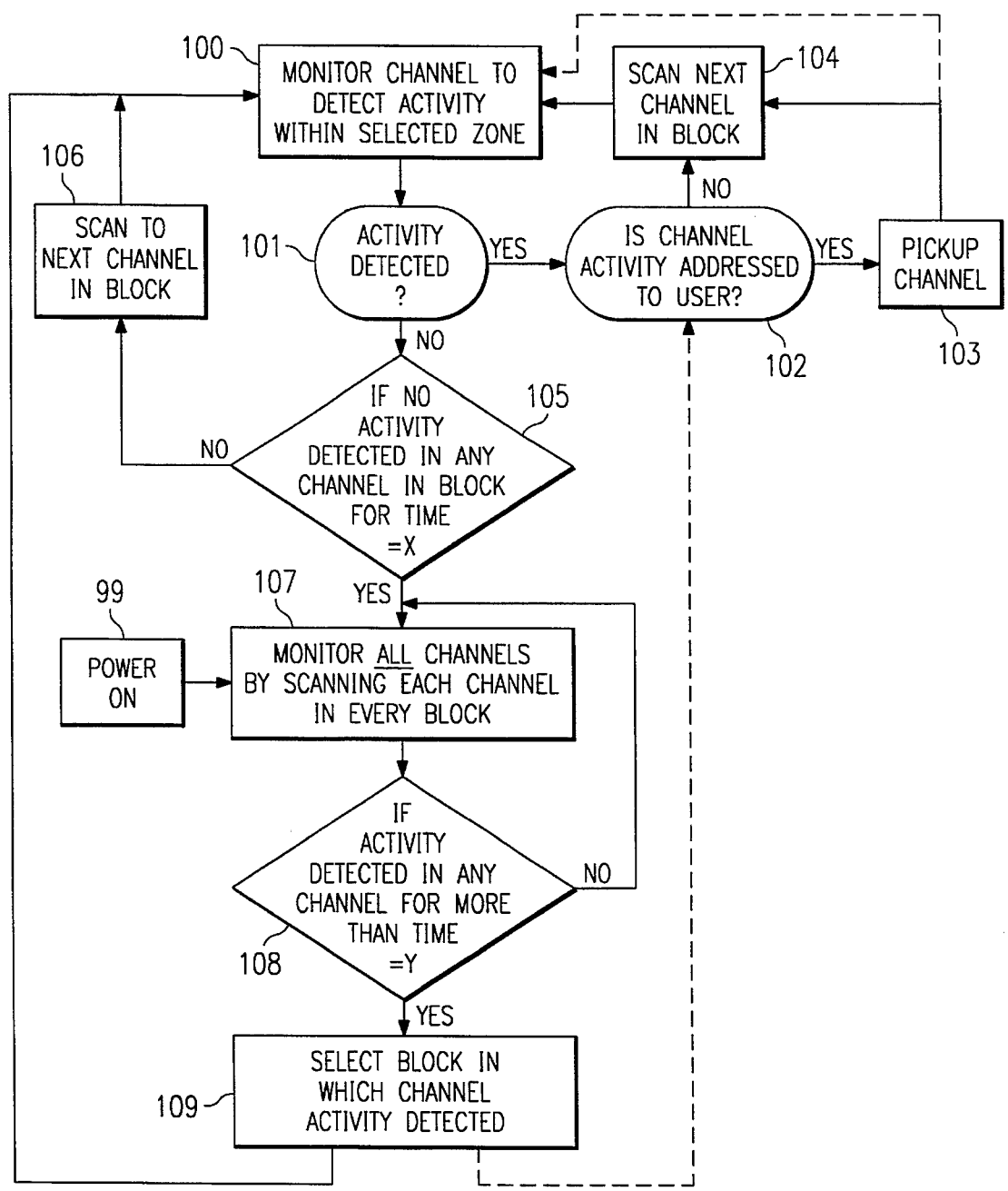
FIG. 3 is a flow chart diagram illustrating the operation of a receiving device according to one embodiment of the present invention.

A mobile message receiving device according to one embodiment of the present invention carries out the operations described in the flow chart of FIG. 3. After the mobile phone 80 is first turned on by operation block 99, the message receiving device begins its functional operation in operational block 107 by monitoring all of the radio channels which have been programmed into the memory 89 and identified by the channel identification information. At this stage, the mobile phone 80 is tuning the antenna 81 to a particular channel, monitoring that channel for any message signal activity, and then incrementing to the next programmed radio channel if no message signal is detected. If no message signals are detected as a result of decision block 108, the mobile phone 80 continues to monitor all of the programmed radio channels.

When message signal activity is finally detected in decision block 108, the mobile phone 80 then selects one of the preprogrammed groups or blocks of channels containing the radio channel on which the message signal was detected (operation block 109). The step of selecting a group of channels can be accomplished in a number of ways, including storage of group identification information or zone information in the zone register 88. Alternatively, the portion of the memory 89 identifying the selected group could be flagged to specially identify that group as being selected.

At this point with a message signal having been detected on a channel, the mobile phone 80 may proceed to decision block 102 to determine whether the message signal is addressed to the user of the mobile phone 80 as shown with the dashed lines connecting operational block 109 and decision block 102. However, because the present invention is directed towards efficient monitoring of a plurality of radio channels, and is not directly concerned with call "pick up" and engagement, the next step indicated in the flow chart of FIG. 3 is operational block 100, in which the mobile phone 80 monitors only those radio channels within the selected group of channels. At this point, the channel monitoring activity has been reduced to monitor only those channels within the selected group, thereby increasing the likelihood that a message signal transmitted on one of the channels within that group will be successfully detected.

If, while monitoring the channels within a selected group, a message signal is detected (decisional block 101), the mobile phone 80 then decides whether the message is addressed to the mobile phone user in decision block 102. If the message signal is addressed to the user, the mobile phone 80 engages the radio channel to "pick up" the message signal in operation block 103, thereby enabling the phone conversation to take place. The operation of a mobile phone during call engagement is not the subject of the present invention, and is not described in detail because those skilled in the art will understand that technology. When the phone conversation is concluded, the mobile phone 80 then scans to monitor the next channel within the selected group of channels in operation block 104, thereby continuing with the monitoring activities as confined to the selected group.

Referring back to decision block 101, if no message activity is detected on a particular channel, the mobile phone continues to successively scan channels within the selected group until a predetermined time period (time=x) has elapsed without any message signal being detected in the group of channels (decision block 105 and operation block 106).

When the microcomputer 85 determines that no message signal has been detected on any of the channels within the selected group for a predetermined time period (decision block 105), the mobile phone 80 then ceases to monitor only the channels within the selected group, and instead monitors all of the channels identified by the channel identification information in the memory 89 (operation block 107). The step of monitoring all of the programmed channels can be accomplished in a variety of ways. Under one embodiment of the present invention, the microcomputer 85 simply steps through each of the channels identified in the memory 89 until a message signal is detected, at which time, and only at that time, a group is selected which contains the channel on which the message was received.

According to an alternative embodiment of the present invention, the microcomputer 85 sequentially retrieves blocks of channels as identified by the zone information in the memory 89. In this embodiment, the microcomputer scans each channel one time within the group for messages, and if no messages are detected in the group scanned, the microcomputer 85 retrieves another group of channels from the memory 89 and scans each of the channels in that group one time. Group by group, this process continues until a message signal is detected, at which time the retrieved group is stored in the zone register 88 or is otherwise marked or flagged as being a selected group. Once a group has been selected, the microcomputer 85 monitors that group of channels for an extended period of time, successively scanning each of the channels in that group for any message signals. When no message signal has been detected in the selected group of channels for a predetermined time period, the microcomputer 85 reverts back to scanning groups of channels group by group.

In accordance with the present invention, the various radio channels which a message receiving device uses are divided into groups and these groups are programmed into the memory of the message receiving device 80. Allocation of radio channels into groups can be accomplished in a variety of ways. For instance, it may be desirable to allocate radio channels having frequencies of a certain range into one group and allocating other channels having frequencies over a different range into a second group. However, in the preferred embodiment of the present invention, the channels are grouped according to their geographic area of coverage. In particular, one group of channels consists of those radio channels whose transmission areas overlap with one another, while a second group of channels consists of channels whose overlapping geographic areas differ from the geographic overlap area for the first group of channels.

In such a system of geographically determined groupings, the performance of the data communication system of the present invention is enhanced if a given group of transmitters, in addition to transmitting message signals, also transmits periodic data, such as regularly transmitted data bursts. If a given group of message signal transmitters also transmit periodic bursts of data, the operation of the present invention will be improved by assuring that a message receiving device located within that group's transmitting region continues to detect channel activity within the selected channel group. In this way, the message receiving device of the present invention will not inadvertently switch to the mode of monitoring all programmed channels solely because no message signals have, by chance, been transmitted in the first group of channels.

A message receiving device of the present invention might also inadvertently decide to switch from monitoring a selected group of channels to monitoring all of the channels if the message receiving device's signal reception is temporarily blocked or lost because of a temporary obstruction, such as a dip in the road or a tunnel. Such an inadvertent switch to full channel mode can be avoided by requiring that no message signals be detected for a minimum predetermined time period such as by way of example, 5–10 seconds, before the device switches to monitoring all channels. This requirement that no message signals be detected for a minimum time period allows the mobile message receiving device 80 to maintain its scanning mode within the selected group, even if signal reception is temporarily blocked.

Although several embodiments of the present invention have been illustrated in the accompanying drawings and described in the foregoing Detailed Description, it will be understood that the invention is not limited to the embodiments disclosed, but is capable of numerous rearrangements, modifications and substitutions without departing from the scope of the invention, and is further intended to encompass any changes which might be made by one skilled in the art of radio design.

I claim:

1. A communication system for efficiently detecting message signals on a plurality of radio channels where the plurality of channels are divided into groups of channels, said communication system comprising:

a message transmitting means for transmitting message signals on the plurality of channels; and at least one message receiving device for scanning channels within a first group of channels defined by zone information stored in the message receiving device to detect any transmitted message signals, said message receiving device switching to scan the plurality of channels when no message signal has been detected on any channel in the first group of channels within a first predetermined time period; wherein said message receiving device, upon detecting a message signal on a channel in a second group of channels for at least a second predetermined time period, switches to scan the second group of channels defined by said stored zone information for message signals.

2. The communication system as recited in claim 1 wherein the message transmitting means comprises at least one transmitter station that transmits periodic data on at least one channel.

3. A method for efficiently monitoring a plurality of radio channels to detect message signals where the plurality of radio channels is divided into at least two groups of channels, said method comprising the steps of:

scanning the plurality of radio channels for message signals;

detecting a message signal on a first channel; and scanning only a first group of channels containing the first channel on which the message signal was detected by retrieving channel block information from memory; comparing the first channel with the channel block information to identify a first group of channels which includes the first channel;

selecting a first group of channels; and scanning only the first group of channels to detect a message signal.

4. The method for efficiently monitoring radio channels as recited in claim 3 further comprising the steps of:

switching to scan the plurality of radio channels for message signals upon determining that no message signal has been detected in the first group of channels within a predetermined time period.

5. The method for efficiently monitoring a plurality of radio channels as recited in claim 4, wherein the switching step comprises the steps of:

activating a clock for a predetermined time period;

monitoring whether any message signals are detected in the first group of channels;

if no message signals are detected in the first group of channels within the predetermined time period, retrieving channel identification information from memory identifying the plurality of radio channels; and successively scanning the plurality of radio channels identified by the channel identification information.

6. A method for efficiently monitoring a plurality of channels which are divided into groups of channels, comprising the steps of:

successively monitoring channels within a first group of channels defined by channel block information stored in a memory to detect message signals;

sampling channels within a second group of channels defined by channel block information stored in said memory if no message signal is detected in the first group of channels for at least a first predetermined time period;

detecting a message signal on a channel which is part of the second group of channels;

successively monitoring channels within the second group of channels to detect message signals.

7. The method for efficiently monitoring channels as recited in claim 6, wherein the step of detecting occurs only if a message signal is detected for more than a second predetermined time period.

8. A mobile message receiving device for efficiently monitoring a plurality of programmed radio channels, comprising:

a selectively tunable receiver for receiving message signals on radio channels;

a controller coupled to the receiver;

a memory coupled to the controller for storing channel block information by which the plurality of programmed radio channels is divided into channel groups;

said controller being coupled to selectively tune the receiver to scan each channel in a first channel group identified by the channel block information, and further being coupled, upon determining that no message signal has been received in the first channel group, to selectively tune the receiver to scan a second channel group identified by the channel block information.

9. The mobile message receiving device as recited in claim 8, wherein the first channel group includes at least a first channel on which a message signal is first detected, and the second channel group comprises channels not included in the first channel group.

10. The mobile message receiving device as recited in claim 8, wherein the first channel group includes at least a first channel on which a message signal is first detected, and the second channel group includes the plurality of programmed radio channels.

11. A two-way radio for monitoring a plurality of radio channels, comprising:

a receiver;

a zone register;

a memory for storing zone information defining multiple groups of said radio channels and for storing channel information identifying each radio channel;

a controller coupled to the memory and the receiver for successively monitoring the plurality of channels identified by the channel information until a message signal is detected on a first channel, and coupled to the zone register to load into the zone register zone information identifying a first group of channels which contains the first channel on which a message signal is received, said controller causing the receiver to scan only the group of channels identified by the zone information stored in the zone register.

12. In a mobile receiving device capable of detecting message signals on a plurality of radio channels, a method for efficiently monitoring the plurality of channels for message signals, comprising the steps of:

successively monitoring each channel of the plurality of radio channels by repeatedly retrieving incremental channel identification information from a memory storage device and tuning a receiver to a channel identified by the channel identification information to detect any message signal until a message signal is detected on a first channel for at least a first time period;

selecting a group of channels identified by information stored in the mobile receiving device which includes the first channel on which a message signal is detected;

monitoring only the selected group of channels to detect message signals until no message signal has been detected in the selected group of channels for a second time period;

again successively monitoring each channel of the plurality of radio channels.

* * * * *